United States Patent Office 2,720,644
Patented Oct. 11, 1955

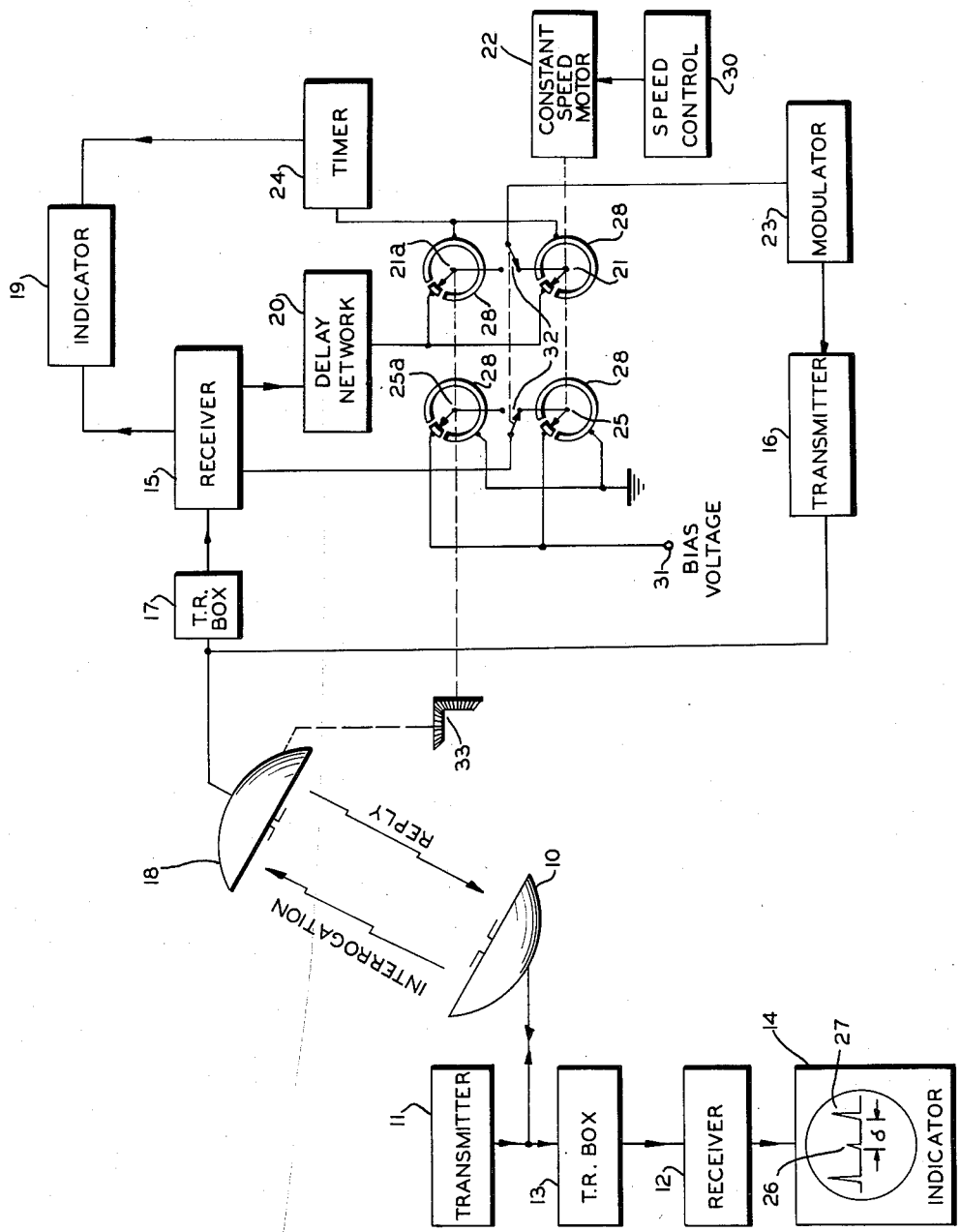

2,720,644

SIMPLIFIED IDENTIFICATION SYSTEM

Everhard H. B. Bartelink, Cambridge, Mass., assignor, by mesne assignments, to the United States of America as represented by the Secretary of the Navy Application November 29, 1945, Serial No. 631,740

3 Claims. (Cl. 343—6.5)

The present invention relates to systems and apparatus which permit identification by radar of remote objects. More particularly this identification system is made possible by utilization of existing radars which undergo but minor changes to incorporate this additional function.

Present day systems of identification require special equipments which are used in conjunction with radar equipments and which cover a different portion of the frequency spectrum. These systems ordinarily comprise a transmitter to emit a challenging pulse and at the object to be identified, a combined receiver and transmitter or transpondor, the receiver detecting and amplifying the challenging pulse and the transmitter, when triggered by this amplified challenging pulse, emitting a coded pulse which is received by a receiver at the first mentioned transmitter. Indicating apparatus of the cathode ray tube type is ordinarily used to present visually the coded received pulse. Systems of this type require apparatus which is both complex and heavy. The present invention involves a unique utilization of any radar equipment carried by the object to be identified to enable the radar equipment to function as a transpondor and permit identification of the object by any radar system of the same frequency which may challenge it.

Accordingly, it is an object of this invention to provide a system of identification of remote objects.

Another object of this invention is to provide apparatus to permit existing radar equipment to be utilized in the identification of remote objects.

Another object of this invention is to provide apparatus to permit a radar system to be used as a transpondor.

Another object of this invention is to provide a radiant energy identification system, as a supplement to a radar system, which comprises a minimum of additional equipment.

It is a further object of this invention to provide an identification system, as a supplement to a radar system, which requires no additional frequency spectrum.

These and other objects will be more readily apparent upon consideration of the following description together with the accompanying drawing which discloses one embodiment of the invention.

In the left hand portion of the drawing is disclosed a first radar set, which for the purposes of this description will be considered to be located on the ground. The term radar as here and hereinafter used in this specification means a complete radio pulse-echo detection system. The radar set includes antenna 10 which radiates the pulse of radio frequency energy produced by transmitter 11. Since a single antenna is used, receiver 12 must also be connected to antenna 10. To prevent damage to receiver 12 during the transmitted pulse, a TR (transmit-receive) box 13, whose construction is well-known to those skilled in the art, is inserted in the radio frequency line between receiver 12 and the junction of the radio frequency lines. The output of receiver 12 is fed to indicator 14 which by means of a cathode ray tube visually presents the main transmitter pulse and any reflected transmitter pulse received. The visual presentation may be of the A-scope or P. P. I. (plan position indicator) type, or it may take any other appropriate form. An A-scope plots signal intensity versus range while a P. P. I. plots range versus azimuth with an image brilliance determined by signal intensity. An A-scope has been disclosed in this embodiment to facilitate the description.

In the right hand portion of the drawing is disclosed a second radar set which for the purposes of this description will be considered to be airborne. This second radar includes receiver 15, which is protected from the energy of associated transmitter 16 by TR box 17, both TR box 17 and transmitter 16 being joined together and to antenna 18. The output of receiver 15 is fed normally to indicator 19 and to delay network 20, which inserts a time delay δ in the electric impulses it subsequently feeds to rotating switch 21. Rotating switch 21 of the commutator type is driven by contant speed motor 22 and allows modulator 23 to be triggered alternately by timer 24 and the delayed electrical impulse from network 20. Modulator 23, in turn, provides a voltage pulse of sufficient energy to cause transmitter 16 to emit a pulse of electromagnetic energy which is subsequently radiated from antenna 18. Another similar rotating switch 25 provides alternately a ground and a negative bias return for the grids of the intermediate frequency stages of the receiver to reduce the gain of the receiver. If the airborne radar has no negative voltage supply, this reduction of gain may be accomplished by positive biasing of the cathodes of said stages. Switch 25 is also driven by constant speed motor 22 and is so keyed to the shaft of motor 22 that the appropriate receiver element as above-described is connected to a bias voltage source connected to terminal 31 whenever switch 21 connects delay network 20 to modulator 23. The switches are shown in the transpondor, or identification, position. The reduction in receiver gain obtained by the use of switch 25 is necessary in order that only those pulses resulting from direct transmission from antenna 10 to antenna 18 will have sufficient energy to trip modulator 23 after traversing receiver 15 and delay network 20.

Assuming that the first radar is tracking the aircraft carrying the second radar, in operation the pulse radiated from ground station antenna 10 then sprays this aircraft with radio frequency energy. The normal reflected energy is returned to ground antenna 10, is amplified by receiver 12, and appears as video pulse 26 on indicator 14. If the airborne radar is in the search position, any transmitted pulse from its antenna 18 received by the first radar will drift across indicator 14, as there exists no synchronization between the repetition frequencies of the airborne and ground station radars. This same ground station search pulse is picked up by airborne antenna 18 and passes through TR box 17 to receiver 15. In normal operation this would appear as interference on indicator 19 and nothing further would result. However, during those periods in which switch 21 connects receiver 15 via delay network 20 to modulator 23, the radar of the challenged object utilizes this received pulse to initiate a synchronized response pulse. A radio frequency reply pulse is thus generated in synchronism with, but delayed after, a challenging pulse of another search radar, in this case the ground station radar.

This response pulse of radio frequency energy is picked up by ground station antenna 10 and progresses through TR box 13 and receiver 12 to appear on the scope of indicator 14 as identification video pulse 27. Identification pulse 27 differs from target echo pulse 26 in the three following respects: first, pulse 27 is delayed from target echo pulse 26 by an interval of time δ, said time δ having been inserted by delay network 20 of the airborne radar; second, pulse 27 has a much larger amplitude than target echo pulse 26 by reason of direct (one-way) transmission of the reply pulse of radio frequency energy as contrasted to the reflected (reradiated) transmission of the challenged object's echo pulse; and third, pulse 27 will occur only during that part of the rotation of antenna 18 which allows approximate coincidence of the two radar beams whereas pulse 26 occurs continuously. Also, in contrast to the above-mentioned drifting pulse obtained in the search position of the airborne radar, pulse 27 will stand still during this period in which the airborne set is a transpondor. The time intervals during which pulse 27 will appear and stand still are determined by a prearranged selection of coding commutators 28 and of the speed of motor 22. Coding commutators of any degree of complexity may replace commutators 28 if desired. In conjunction with the choice of commutators, speed control 30 makes certain that the period during which the radar functions as a transpondor will always be at least one complete revolution of antenna 18. A more direct method of insuring transpondor action for at least one revolution of antenna 18 is illustrated by the gear mechanism at 33 which drives switches 25a and 21a from antenna 18. A selsyn drive could replace this gear mechanism if desirable. Two position switch 32 allows switching between constant speed motor drive and direct antenna drive.

The advantages of the present embodiment can be seen to include simplified identification equipment for all radar carrying aircraft. Furthermore, the radar recognition range of the ground stations is expanded, since there is one-way transmission in both cases of the radio frequency pulses pertinent to the establishment of identification. Consideration of the inverse square law for one-way transmission versus the inverse fourth law for two-way (target reflection) transmission, in addition to the small effective reflecting area of the challenged object, makes quite clear the advantage of radar detection and identification of this nature over ordinary radar detection.

It is readily seen, after examination of the previous discussion, that the two transmitters need not of necessity be of exactly the same frequency. As long as the transmitter frequency of the challenging radar falls within the pass band of the receiver of the challenged radar and the transmitter frequency of the challenged radar falls within the pass band of the receiver of the challenging radar, this system of identification will function. While this seems to presuppose a rather complete knowledge of the frequencies involved, such knowledge is not actually necessary. There are defined limits of the frequency spectrum within which the output of each airborne radar lies. These defined limits in turn determine the limits of frequency between which must exist the acceptance band made possible by local oscillator tuning of the associated airborne receiver. Armed with a knowledge of these frequency limits, a number of ground station radars of different transmitter frequencies can be arrayed in such fashion that each individual ground radar covers a discreet portion of the above-defined frequency band, the summation of these discreet portions giving complete coverage between the above-mentioned defined limits of the frequency spectrum. The information received from these individual sets would then be evaluated at a centralized plotting board. Also, a wide band receiver may be used in the ground set.

The foregoing description has presented an explanation of this invention in the particular application of air-to-ground identification, but the principles of this invention are of broader application in ways which will be apparent to those skilled in the art. It will be understood that the above-disclosed embodiment is primarily illustrative and that the invention includes such other embodiments as fairly come within the spirit and scope of the appended claims.

What is claimed is:

1. An identification system including a radio pulse echo object detection set comprising, a pulse transmitter, a receiver, a delay network for said receiver output, a timer, and a modulator to control said transmitter, a rotating switch for alternately connecting said modulator to said delay network and to said timer, means for suppressing in said receiver the transmitted pulse of said pulse transmitter, a second rotating switch for changing the gain of said receiver and so synchronized with said first switch that the higher gain occurs when the modulator is connected to said timer, and a constant speed motor for driving said switches, whereby said set will alternately function in normal manner and as a transpondor.

2. The combination of claim 1 including a rotary antenna connected to said set, a driving mechanism to rotate said antenna, and means to operate said first and second rotating switches from said driving mechanism.

3. The combination of claim 1 in which said rotary switches include coded commutators to provide a prearranged selection of identifying pulses.

References Cited in the file of this patent

UNITED STATES PATENTS

| | | |
|---|---|---|
| 2,134,716 | Gunn | Nov. 1, 1938 |
| 2,252,083 | Luck | Aug. 12, 1941 |
| 2,381,940 | Wallace et al. | Aug. 14, 1945 |
| 2,414,096 | Dimond | Jan. 14, 1947 |
| 2,414,469 | Isbister | Jan. 21, 1947 |
| 2,495,737 | Labin (2) | Jan. 31, 1950 |
| 2,509,237 | Labin (1) | May 30, 1950 |
| 2,515,178 | Barchok | July 18, 1950 |
| 2,517,540 | Busignies | Aug. 8, 1950 |
| 2,532,307 | Hess | Dec. 5, 1950 |